(No Model.)
G. E. CLARK.
BAKING PAN.
No. 277,679. Patented May 15, 1883.
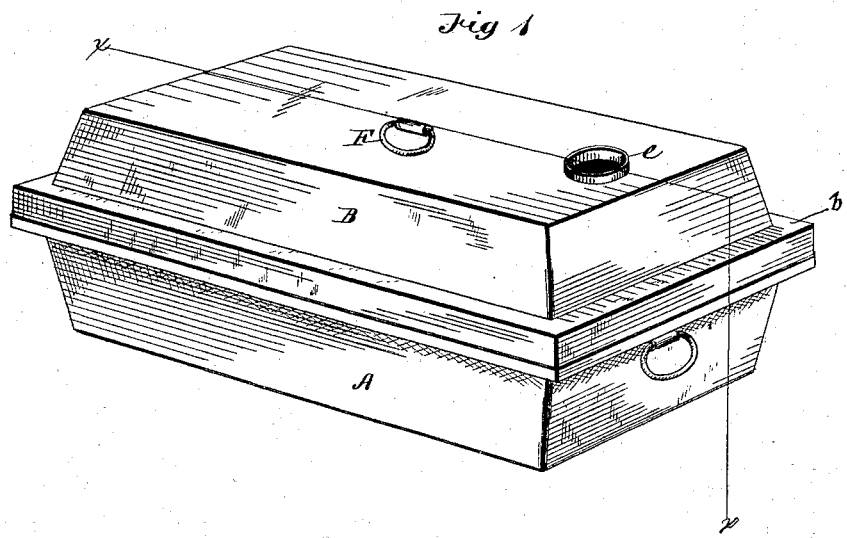
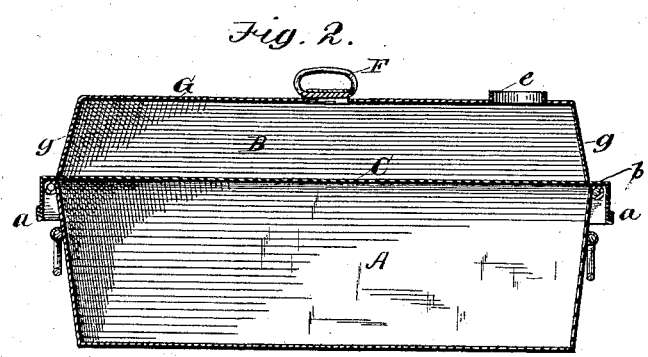
Witnesses,
W. H. H. Knight
W. E. Chaffee
Inventor,
Geo. E. Clark
by Louis Koonagy
atty.

United States Patent Office.

GEORGE E. CLARK, OF KINGMAN, MAINE.

BAKING-PAN.

SPECIFICATION forming part of Letters Patent No. 277,679, dated May 15, 1883.

Application filed March 25, 1881. (No model.)

*To all whom it may concern:*

Be it known that I, GEORGE E. CLARK, a citizen of the United States, residing at Kingman, in the county of Penobscot and State of Maine, have invented certain new and useful Improvements in Baking-Pans; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to that class of lids or covers for bake-pans provided with water-chambers, the object being to provide a lid or cover of such construction that the contents of the pan may be prevented from burning, and also fully protected from air during the cooking.

Heretofore various forms of lids with water-chambers and air-passages have been used; but they have all been more or less defective, in that they have been too expensive in construction for universal use, and also because the forms of their edges or flanges have prevented the ready application of the lid to or its removal from the pan. It is well known that in lids of this class, where a chamber filled with water is employed, considerable care must be exercised in placing the lid upon or removing it from a pan. For this reason a tight-fitting joint, as where the lid is "sprung" over the bead of the pan, is objectionable.

My invention consists in the construction hereinafter set forth, whereby the lid is so formed and arranged that when placed in position upon the pan it will completely prevent the admission of air to the articles contained therein during the cooking operation, and whereby the said articles being cooked are preserved in a humid and moist condition.

In the drawings, Figure 1 is a perspective view of a pan provided with my improvement, and Fig. 2 is a vertical section of the same on the line *x x* of Fig. 1.

A represents a pan of rectangular form.

B is the lid, having a base, C, top G, and walls *g*, the whole forming a chamber or reservoir for containing water.

F is a ring for applying and removing the lid, and *e* an opening for filling the water-chamber.

The edge of the lid consists of the horizontal portion *b* and the droop or flange *a*, the latter being of a length about one-half the height of the walls *g* of the lid. By this construction the lid may be easily applied to a pan by simply catching hold of the ring F and lowering the lid onto the pan, when the part *b* of the edge will rest upon the edge of the pan, while the flange *a* will project below said edge, fully protecting the contents of the pan from air. Thus it will be seen that all the annoyance of a sprung joint is avoided, while at the same time a practically air-tight connection of the lid and pan is secured.

I claim—

The combination, in a bake-pan, of a lid adapted to set thereon and render the said pan air-tight, the said lid consisting of the base C, top G, and walls *g*, forming a water-chamber, an opening *e*, ring F, edge *b*, and flange *a*, the latter projecting downwardly to extend below the edge of the pan, substantially as and for the purpose set forth.

In testimony whereof I affix my signature in presence of two witnesses.

GEORGE E. CLARK.

Witnesses:
HENRY A. SMITH,
STILLMAN S. JORDAN.